United States Patent [19]
Kump

[11] Patent Number: 6,158,702
[45] Date of Patent: Dec. 12, 2000

[54] METHOD AND APPARATUS FOR TEMPORARILY APPLYING DECORATIONS TO OBJECTS

[76] Inventor: Josephine M. Kump, 174 Garden Park Dr., Orem, Utah 84057

[21] Appl. No.: 09/201,266

[22] Filed: Nov. 30, 1998

Related U.S. Application Data

[60] Provisional application No. 60/067,132, Dec. 2, 1997.

[51] Int. Cl.[7] .................................................. A45D 42/14
[52] U.S. Cl. ...................... 248/206.2; 211/86.01; 248/206.3
[58] Field of Search ................ 248/206.2; 211/86.01; 47/41.01, 41.15; 218/205.5, 205.7, 205.8, 206.3

[56] References Cited

U.S. PATENT DOCUMENTS

| | | | |
|---|---|---|---|
| 3,514,065 | 5/1970 | Litt et al. | 248/206.2 |
| 4,828,303 | 5/1989 | Soria | 293/128 |
| 4,881,485 | 11/1989 | Feinberg | 116/28 R |
| 5,078,356 | 1/1992 | Adams | 248/206.2 |
| 5,080,941 | 1/1992 | Kosowan | 248/206.2 |
| 5,323,996 | 6/1994 | Rendall | 248/205.3 |
| 5,365,884 | 11/1994 | Jones | 119/256 |
| 5,386,960 | 2/1995 | O'Brien | 248/205.5 |
| 5,960,572 | 10/1999 | DeVito | 40/593 |

Primary Examiner—Ramon O. Ramirez
Assistant Examiner—Walter Landry
Attorney, Agent, or Firm—Madson & Metcalf

[57] ABSTRACT

A modular kit for decorating vehicles, boats, buildings, and other objects may include a plurality of modular decorative items to be fastened to exterior or interior surfaces of an object. One or more decoration fasteners may be used to temporarily fasten the decorative items to the object. A removable message may also be included. The message may comprise vinyl characters. A multiple decoration fastener may also be included for attaching larger or multiple decorative items to locations such as a bumper of a vehicle. The decoration fastener may comprise at on end thereof a decorative item receiver. The decorative item receiver may comprise an opening and a deflectable lip at least partially defining the opening for retaining decorative items. At another end, a fastening device such as a clip or a suction cup is provided. In one embodiment, the decoration fastener has a pliable surface and an outward turned lip to prevent damage to the object to which the decoration fastener is temporarily attached. In another embodiment, the decoration fastener is integrally formed from a single material. The single material is preferably a pliable material such as rubber. The rubber may have varying durometer ratings.

7 Claims, 5 Drawing Sheets

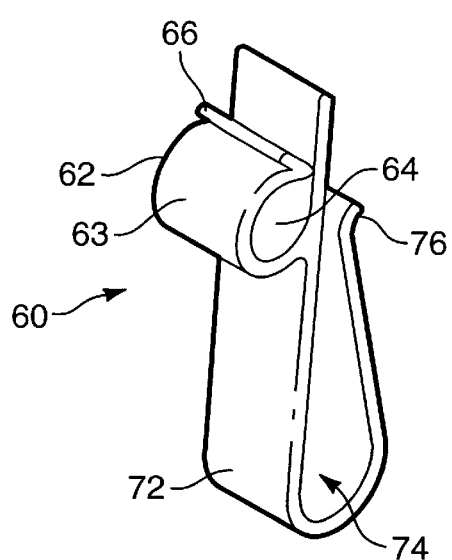 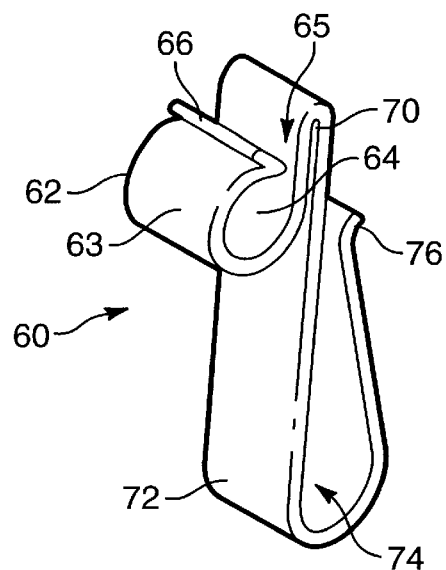
Fig. 5     Fig. 5a
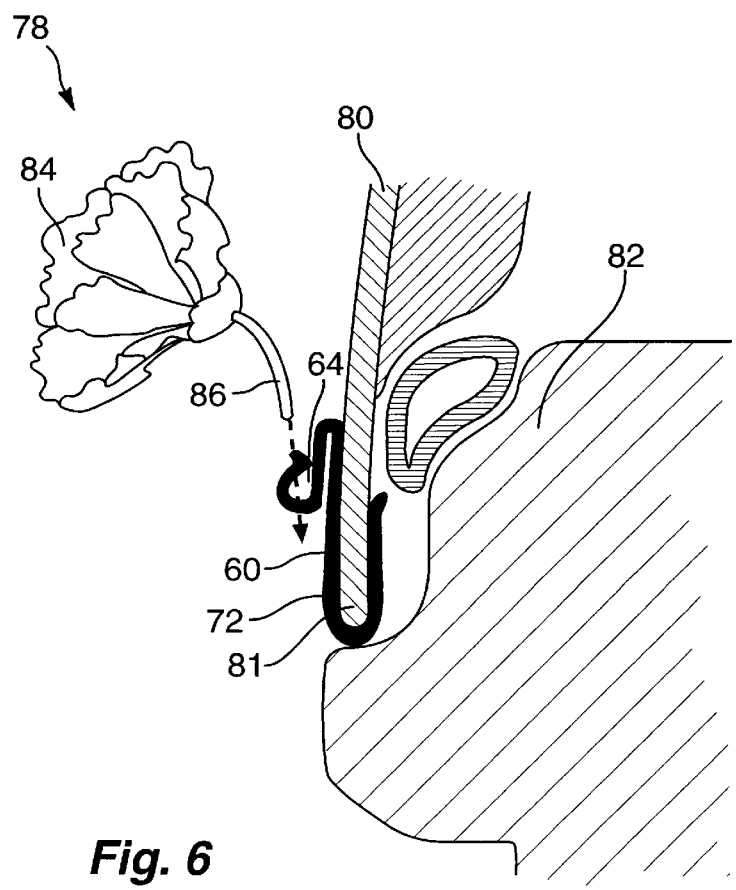
Fig. 6

METHOD AND APPARATUS FOR TEMPORARILY APPLYING DECORATIONS TO OBJECTS

RELATED APPLICATIONS

This application is a continuation-in-part of my co-pending provisional patent application Ser. No. 60/067,132, filed on Dec. 2, 1997 for Method and Apparatus for Decorating Vehicles.

BACKGROUND OF THE INVENTION

1. The Field of the Invention

The present invention relates to devices for attaching modular decorative items to walls, vehicles, boats, and the like. More specifically, the present invention relates to devices and kits for temporarily attaching modular decorative items to various selected surfaces of such objects without harming the objects.

2. The Relevant Technology

It is a custom in many countries to decorate the vehicles of couples who have just been married and who are embarking on a honeymoon. Such decoration is usually spontaneous, can be relatively expensive, less than eye appealing, and above all, harmful to the vehicle being decorated.

Vehicles, boats, and other objects are often temporarily decorated for other events as well. Cars in which dignitaries ride are often decorated for parades. Boats and recreational vehicles (RVs) are, from time to time, decorated for parties, receptions, and the like. Temporary decorations are also frequently applied within yards, homes, and other such locations in conjunction with weddings, parties, celebrations, and such.

Despite the frequent use of temporary decorations on vehicles and other objects as described, there has yet to appear any organized pattern, kit, plan, or other aid in temporarily decorating the vehicles and other such objects. Often, the vehicles and such objects go undecorated, or are not decorated to the satisfaction of the hosts or well-wishers because of a lack of organization, suitable materials, and/or creativity.

When temporary decorations are applied to vehicles, for instance, the decorative efforts of the well-wishers, while good intentioned, have been known to scratch, dent, discolor, and cause damage to the exterior and interior of the decorated vehicle. The hastily prepared decorations can also make driving the vehicle dangerous to the occupants and to other motorists, due to obscured vision, illumination system, interference, and loosely attached decorations that can fly off at any time to startle motorists and obstruct traffic.

Accordingly, it would be beneficial to provide a safe, artistic, flexible scheme and readily available materials for implementing the scheme to temporarily decorate the vehicles or other objects. For instance, consumers may find it beneficial to temporarily decorate the vehicles, boats, interiors of boats, buildings, RVs, and other such objects with a custom scheme that is already organized and which installs quickly, easily, and safely, without harming the object being decorated.

Because such decorations are viewed as individual expression, any such scheme and accompanying devices and materials should be flexible and configurable in a variety of different designs. Making each scheme, devices, and materials reusable would be even more beneficial. Such a scheme should also be inexpensive.

Accordingly, a need exists for an organized scheme for decorating vehicles, RVs, boats, buildings, yards, and other such objects which is attractive, reusable, inexpensive, and which is not harmful to the objects being decorated. Materials for implementing the scheme in apparatus and kit form are also needed.

OBJECTS AND BRIEF SUMMARY OF THE INVENTION

The apparatus of the present invention has been developed in response to the present state of the art, and in particular, in response to the problems and needs in the art that have not yet been fully solved by currently available decorating apparatus and methods. Thus, it is an overall objective of the present invention to provide an apparatus, method, and modular kit for temporarily decorating objects that overcomes the above-discussed and other shortcomings in the art.

The modular kit is preferably used for decorating vehicles, boats, buildings, and other objects. A plurality of modular decorative items may be included in the kit for being fastened to exterior or interior surfaces of an the vehicle or other object being temporarily decorated.

One or more decoration fasteners may be used to temporarily fasten the decorative items to the object. The decoration fastener may comprise at on end thereof a decorative item receiver. The decorative item receiver may comprise an opening and a deflectable lip at least partially defining the opening for retaining decorative items. At another end, a fastening device such as a clip or a suction cup is provided.

In one embodiment, the decoration fastener has a pliable surface and an outward turned lip to prevent damage to the object to which the decoration fastener is temporarily attached. In another embodiment, the decoration fastener is integrally formed from a single material. The single material is preferably a pliable material such as rubber. The rubber may have varying durometer ratings.

A multiple decoration fastener may also be included for attaching larger or multiple decorative items to locations such as a bumper of a vehicle. The multiple decoration fastener may comprise a hardened housing encasing a block of floral foam. A plurality of hooks may be included for use in attaching the fastener to a license plate holder, tailgate, panel edge, or bumper rim of the vehicle. It is preferred that two lateral sides in the housing are each provided with an opening therein for insertion of decorative items therein.

Further openings are preferably provided in the top side of the housing for the insertion of additional decorative items. A suction cup may also be provided on one side of the housing for suctionally attaching to a smooth surface of the vehicle.

A removable message may also be included in the kit. In one embodiment, the removable message comprises vinyl characters that are moistened and applied directly to a surface of the object.

This and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention given by way of example and are not therefore to be considered to be limiting of its scope, the invention will be described and explained with additional specificity and detail through the use of the accompanying drawings in which:

FIG. 5 is a perspective view of one embodiment of a triple-bend decoration fastener of the present invention.

FIG. 6 is a partial cross-sectional view of an automobile depicting one manner of application of the triple-bend decoration fastener of FIG. 5 to an automobile.

DETAILED DESCRIPTION OF THE PREFERRED EMBODIMENTS

Figure 1:
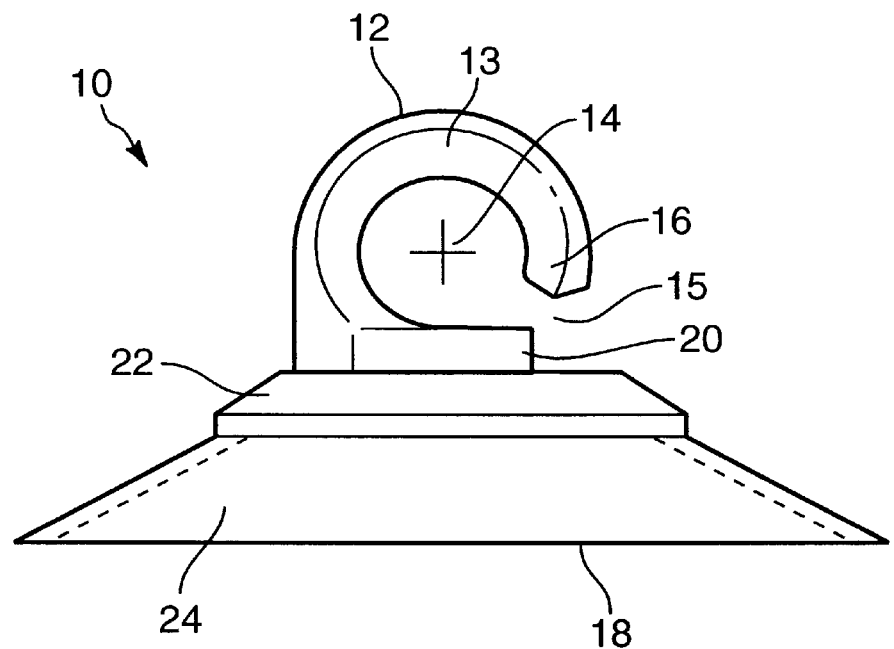
FIG. 1 is a side view of one embodiment of a suction cup decoration fastener of the present invention.
Figure 1A:
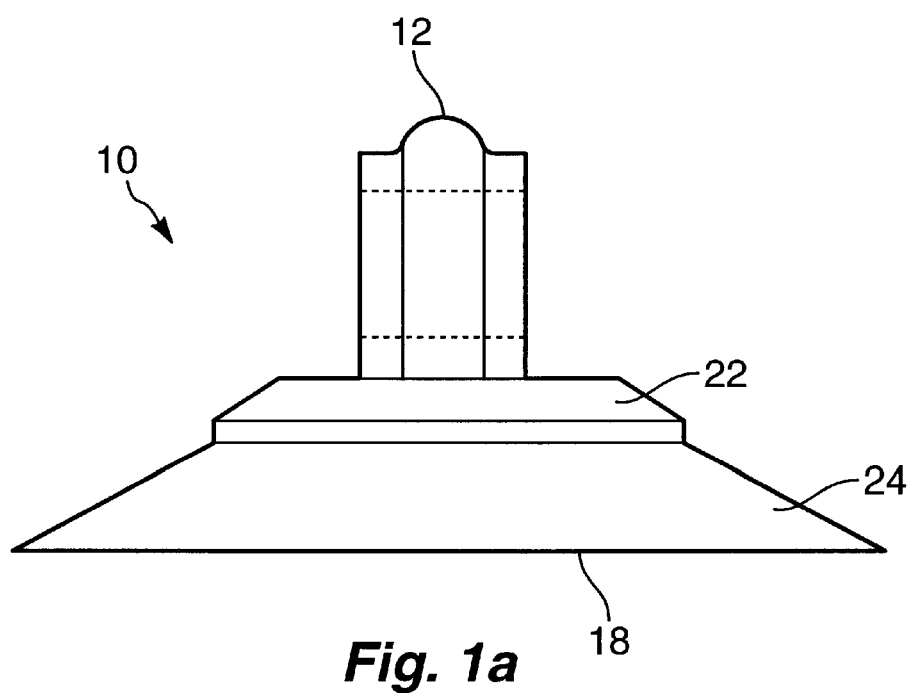
FIG. 1a is a rear view of the suction cup decoration fastener of FIG. 1.

FIGS. 1 and 1a show one embodiment of a suction cup decoration fastener 10 of the present invention. The suction cup decoration fastener 10, as currently contemplated, may be used for attaching modular decorative items to objects such as vehicles, boats, and walls. The decorative items may comprise floral arrangements, bows, net runners, messages, and the like, as shown in FIGS. 3a, 4, 6, 8, and 9. The suction cup decoration fastener 10 may be used independently or as part of a temporary decoration kit described below.

In the depicted embodiment, the suction cup decoration fastener 10 comprises a decorative item receiver 12 connected by a base 20 to a suction cup 18. The decorative item receiver 12 comprises a hooked arm 13 emanating from the base 20 that curves in a substantially annular manner to form an opening 14. It will be readily apparent to one of skill in the relevant art that the opening 14 could be formed in any manner suitable to perform the function of temporarily retaining a decorative item. For instance, the curvature of the hooked arm 12 need not be annular. Accordingly, the opening 14 could be of a shape other than the substantially circular shape that is shown. The opening 14 could also be formed with two or more arms rather than a single hooked arm 13.

In the depicted embodiment, the hooked arm 13 is connected only at one end to the base 20, leaving an ingress gap 15. Once again, it should be readily apparent that the opening 14 could be formed by a hooked arm that fully circumscribes the opening 14, eliminating the ingress gap 15. The ingress gap 15 could also be formed between two or more hooked arms.

A lip 16 is shown at one end of the hooked arm 13. The lip 16 is deflectable to allow a portion of a modular decorative item to be inserted into the opening 14 through the ingress gap 15. The lip 16 may have a turned out portion extending away from the remainder of the hooked arm 13 to facilitate easy and nondamaging ingress of decorative items into the opening 64. Such an arrangement is shown by lip 38 of FIG. 2.

The lip 16 is also preferably resilient, having a memory. Accordingly, the lip 16 may be deflected outward to enlarge the ingress gap 15 and thereby accommodate a decorative item such as the stem or stems of a floral arrangement. Once the decorative item has been inserted into the opening 14, the lip 16 flexes back into its original detente position, thereby securely retaining the decorative item. The deflection of the lip 16 may occur as a result of a bending of the hooked arm 13 at the lip 16 itself, or at any point along the hooked arm 13, including at the intersection with the base 20.

The suction cup 18 is shown as comprising an inner ring 22 extending outward from and surrounding the base 20. An outer ring 24 extends outward from and surrounds the inner ring 22. Both the inner ring 22 and the outer ring 24 slant inward to create a concavity within the suction cup 18. The inner ring 22 is preferably of a greater thickness than the outer ring 24. In one embodiment, the inner ring 22 has a thickness of about ⅛ inches, and the outer ring 24 has a thickness of about ¹⁄₁₆ inches. This difference in thickness allows the suction cup 18 to fully compress and flatten against a surface to which it is applied, creating a strong pulling force towards the center thereof to cause a high suction pressure.

It is preferred that the suction-cup decoration fastener 10 be formed of a single, resilient material. In one embodiment, the suction-cup decoration fastener 10 is formed entirely of rubber. The rubber has varying durometer strengths across different components of the suction-cup decoration fastener 10. For example, the suction cup 18 preferably has a low durometer rating, while the base 20 has a higher rating. The hooked arm 12 may have a lower rating than the base 20, and the lip 16 may have a lower rating than the hooked arm 13.

In one contemplated manner of use of the suction cup decoration fastener 10, a decorative item is placed within the opening 14, preferably in the manner described above. The suction cup 18 is then suctionally attached to a surface. The surface may be an exterior painted surface such as the chassis of a vehicle or boat. The surface may also comprise a wall or an interior surface. Of course, the suction cup 18 could also be applied to the surface first, and the item placed within the opening 14 thereafter. The suction cup 18 is designed to keep the decorative item attached to the surface, even at speeds of 50 miles per hour or more. The preferred manner of use of the suction cup decoration fastener 10 will be discussed in greater detail below.

Figure 2:
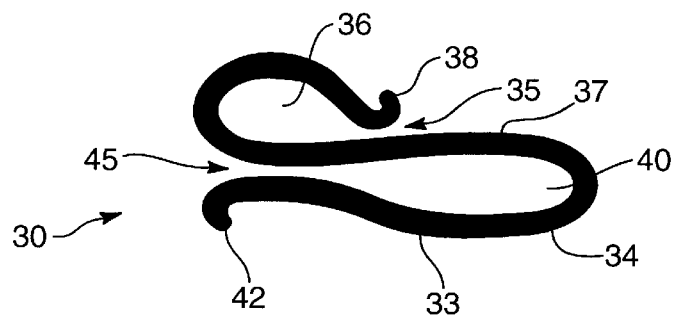
FIG. 2 is a side view of one embodiment of a double-bend decoration fastener of the present invention.

FIG. 2 shows one embodiment of a double-bend decoration fastener 30 of the present invention. The double-bend decoration fastener 30 of FIG. 2 comprises a decorative item receiver 32 and a clip 34. The decorative item receiver 32 is shown comprising a hooked arm 31 forming an opening 36 within which decorative items can be retained. As with the hooked arm 13 of FIG. 1, the hooked arm 31 may fully circumscribe the opening 36. The hooked arm 31 may also partially circumscribe the opening 36, leaving an ingress gap 35, as shown.

In the depicted embodiment, a tip of the hooked arm 31 forms a lip 38. The lip 38 is deflectable in order to provide ingress and egress of the decorative items as discussed above, and, similarly, is provided with resiliency and a memory in order to firmly retain the decorative item within the opening. The lip 42 is also preferably turned out from the remainder of the clip arm 33 to facilitate easy and non-damaging ingress of decorative items into the opening 64.

The clip 34 is used to secure the double-bend decoration fastener 30 to the edges of thin surfaces. In the depicted embodiment, the clip 34 is formed with a backbone 37 connecting the clip 34 to the hooked arm 31. A clip arm 33 emanates from the backbone 37 and curves around to form an opening 40. The opening is shown to be oblong and to have an ingress gap 45, but of course, the opening could be of any suitable shape and configuration.

A lip 42 is shown at one tip of the clip arm 33. The lip 42 is deflectable, substantially in the same manner as the lip 38, and similarly, is provided with resiliency and a memory. The resiliency of the lip 42 provides an inward pressure on the thin surface to which the clip 34 is attached, to firmly grip the thin surface and securely attach the double-bend decoration fastener to the thin surface.

The clip arm 33 of the clip 34 is shown with an orientation opposite of the orientation of the hooked arm 31. Similarly, the ingress gap 35 is oriented opposite the ingress gap 45. In the depicted embodiment, the double-bend decoration fastener 30 is formed from a single elongated strip of material bent in two opposite directions to form the hooked arm 31 and the clip 34.

The single elongated strip of material may be formed of any suitable material that will provided the requisite resiliency. It is also preferred that the outer surface of at least the lip 42 and clip arm 33 of the clip 34 be formed of a resilient material such as rubber. In one embodiment, the elongated strip of material comprises plastic or metal and is coated with a resilient rubber. The double-bend decoration fastener 30 could also be formed exclusively of a resilient material such as rubber as described above for the suction-cup decoration fastener.

Figure 3:
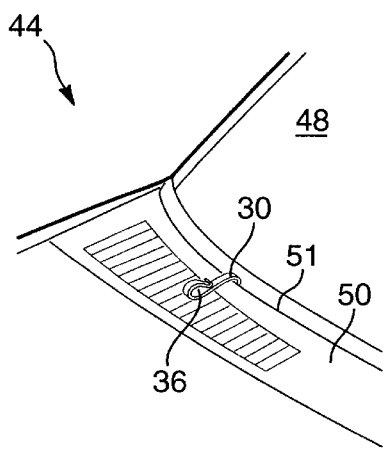
FIG. 3 is a perspective view depicting one manner of application of the double-bend decoration fastener of FIG. 2 to the hood of an automobile.

FIG. 3 depicts one contemplated manner of use of the double-bend decoration fastener 30 of the present invention. Seen in FIG. 3 is a vehicle 44 to which a decorative item in the form of a floral arrangement 52 is being applied with the double-bend decoration fastener 30. The double-bend decoration fastener 30 is fastened to a thin edge 51 of a surface such as a hood or front deck 50 of an automobile 44. In so doing, the clip is pushed onto the thin edge 51, such that the opening 40 receives the thin edge 51 through the ingress gap 45. In so doing, the lip 42 is deflected outward, as the thin edge 51 passes therethrough and remains deflected outward as the thin edge 51 substantially fills the opening 40. The resiliency of the lip 42 maintains a substantial pressure on the thin edge, securely retaining the double-bend decoration fastener 30 to the hood or front deck 50.

Figure 3A:
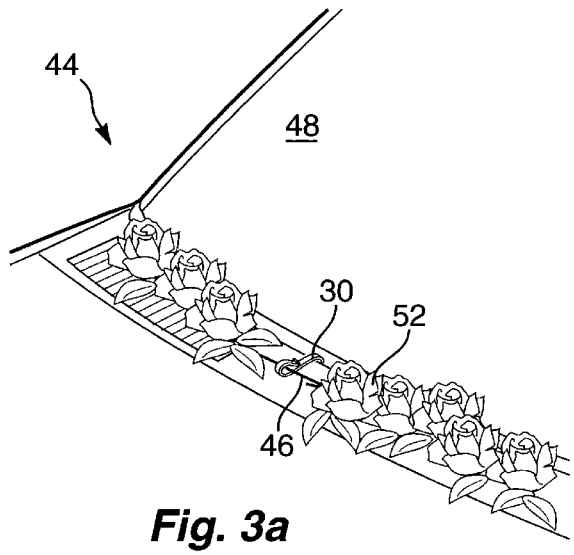
FIG. 3a is a perspective view of the double-bend decoration fastener of FIG. 3 being used to temporarily attach a decorative item to the hood of an automobile.

FIG. 3a shows one manner of attaching decorative items to the hood or front deck 50 of a vehicle. Seen therein is a stem 46 of a floral arrangement 52. The stem 46 is placed within the opening 36 formed by the hooked arm 33 of the double-bend decoration fastener 30. The floral arrangement 52 is shown elongated, extending across substantially the entirety of the front deck 50. In such a situation, it is preferred that the floral arrangement be connected by an underlying stem 46, and that a series of double-bend decoration fastener 30 be arrayed across the thin edge 51 of the hood or front deck 50, each retaining therein a portion of the stem 46.

Figure 4:
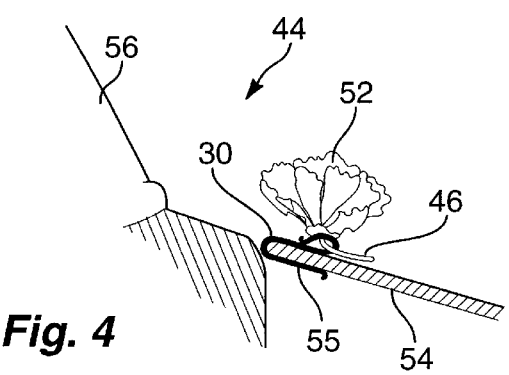
FIG. 4 is a perspective view of the double-bend decoration fastener of FIG. 2 being used to connect a decorative item to a trunk of a vehicle

FIG. 4 shows a double-bend decoration fastener 30 being used to temporarily attach a decorative item 52 to a trunk lid 54 of an automobile. As seen therein, the clip 34 is inserted over an edge 55 of the trunk lid 54. A stem 46 of the decorative item 52 is retained within the opening 36 of the decorative item retainer 32.

FIG. 5 shows one embodiment of a triple-bend decoration fastener 60 of the present invention. As seen therein, the triple-bend decoration fastener 60 is provided with a decorative item receiver 62 and a clip 72. The decorative item receiver 62 is separated from the clip 72 by an intervening central loop 68.

The decorative item receiver 62 is formed with a hooked arm 63 curving back on itself to define therein an opening 64. At one tip of the hooked arm 63 is formed a deflectable lip 66. The deflectable lip 66 is preferably resilient and provided with a memory, in substantially the same manner as the deflectable lips 16, 38 described above. The deflectable lip 66 is also preferably turned out from the remainder of the hooked arm to facilitate easy and nondamaging ingress of decorative items into the opening 64.

The hooked arm 63 is shown to only partially curve toward the central loop, leaving an ingress gap 65 for placing decorative items within the opening 64. Once again, the decorative item receiver 62 could be formed in any suitable manner.

The central loop 68 is disposed between the decorative item receiver 62 and the clip 66. The central loop 68 is shown formed with an opening 70 in the center thereof. It is also contemplated that the central loop 68 could be a single prong extending outward from the decorative item receiver 62 and the clip 72.

The clip 72 is connected to the central loop on a side opposite the decorative item receiver 62. In the depicted embodiment, the clip 72 is provided with an arm 75 emanating from the central loop 68 and curving around towards the central loop 68 to define an opening 74. Thus, in the depicted embodiment, the decorative item receiver 62 functions in substantially the same manner as described above for the decorative item receiver 12 and 32 of FIGS. 1 and 2. The depicted clip 72 functions in substantially the same manner as described above for the clip 34 of FIG. 2.

The triple-loop decoration fastener 60 is preferably formed of a single strip of material, in substantially the same manner as described above for the double-bend decoration fastener. Rather than being formed with two opposite curves, however, the decorative item receiver 62 and the clip 72 each curve upward. The central loop 68 curves in the opposite direction at the center of the decorative item receiver 62 and the clip 72.

FIG. 6 shows one manner of use of the triple-loop decoration fastener 60 of FIG. 5. Seen therein is a cross-section of a vehicle 78 having a door 80 and an interior 82. The triple-loop decoration fastener 60 is shown temporarily attached to an edge 81 of the door 80. A decorative item 84 is shown with a stem 86 being inserted into the opening 64 of the triple-loop decoration fastener 60.

Figure 7:
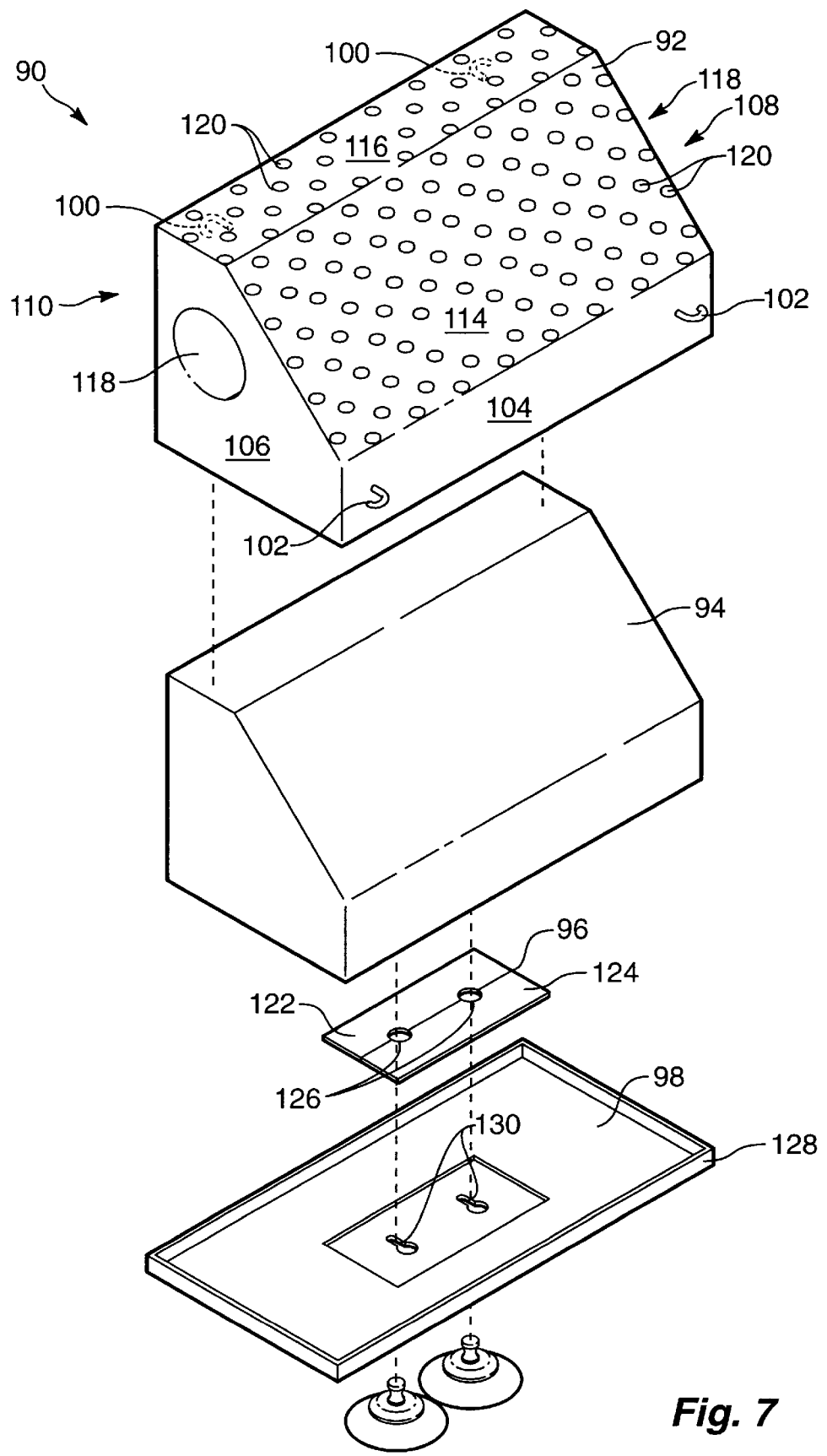
FIG. 7 is an exploded perspective view of one embodiment of a multiple decoration fastener of the present invention.

FIG. 7 shows an exploded view of a multiple decoration fastener 90 of the present invention. The multiple decoration fastener 90 is shown comprised of a hardened housing 92, a floral foam block 94, an insert plate 96, and a bottom cap 98. The floral foam block 94 is installed within the housing 92.

The insert plate 96 is placed at the bottom of the floral foam 94 within the housing 92, and the bottom cap 98 is snapped or glued to the bottom of the housing 92, retaining the floral foam 94 and the insert plate 96 within the housing 92.

Figure 9:
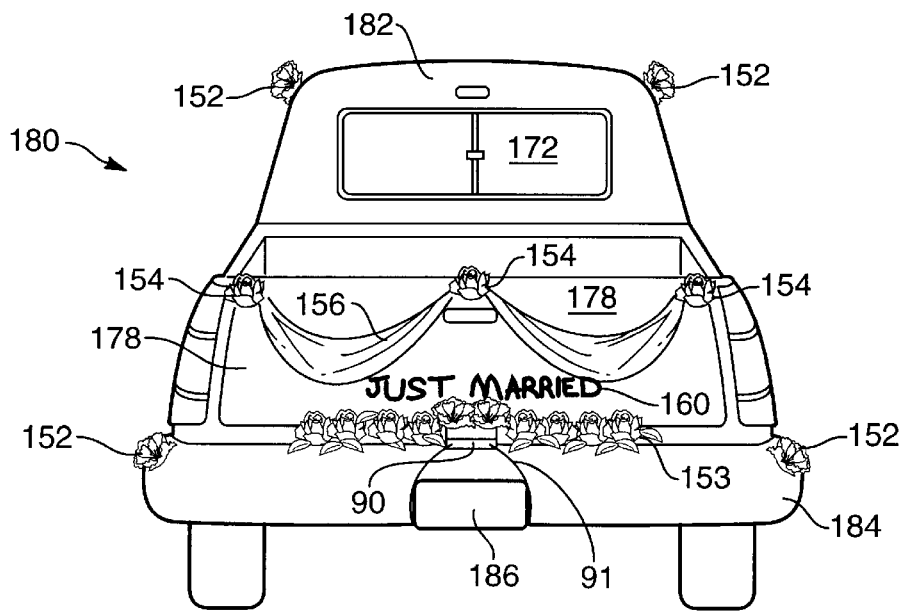
FIG. 9 is a perspective view of an automobile depicting another manner of temporarily decorating a vehicle under the present invention.

The housing 92 is provided with a plurality of hooks 100 and 102 for use in temporarily attaching the multiple decoration fastener 90 to an object or vehicle. In one contemplated manner of use, string, wire, or elastic bands are looped through the hooks 100, 102 and placed around a bumper or license plate holder (such an arrangement is shown in FIG. 9). The housing 92 has a plurality of sides, a front 104, right 106, left 108, an angled top portion 114, and a flat top portion 116. Lateral stem openings 118 are formed in the right side 106 and in the left side 108. The lateral stem openings are typically relatively large, such as a three quarter inch in diameter. Accordingly, large decorative items, possibly comprising multiple stems of flowers or the like, can be placed therein, such that the decorative items can protrude out the side of the multiple decoration fastener 90.

Top stem openings 120 are formed in the angled top portion 114 and in the flat top portion 116. The top stem openings 120 are smaller than the lateral side openings 118, typically about ¼ inch in diameter, and are dispersed across the angled top portion 114 and the flat top portion 116. Accordingly, individual stems of flowers or other such decorative items can be placed therein. The angle of the angled top portion 114 allows the decorative items to protrude directly out from the center of an angled location such as the top of a bumper.

The insert plate 96 is shown formed from two insert halves 122, 124. Openings 126 are formed between the insert halves 122, 124. The bottom cap 98 is provided with sides 128 and is slightly larger in surface area than the housing 98 such that the sides 128 can surround the bottom of the housing 98. The bottom cap 98 may be capped or glued to the housing 92. keyed openings 130 are formed in the bottom cap 98. The keyed openings or other such openings may also be located in other sides, particularly in the rear side 110.

The keyed openings 130 are adapted to receive the hooked arm 13 of the suction cup decoration holder 10 of FIG. 1 or the hooked arm 31 or 63 of the double-bend or triple-bend attachment devices 30, 60, of FIGS. 2 and 6. The hooked arm 13, 30, 60 is passed through the keyed openings 130 and then the insert halves 122, 124 are placed around the hooked arm 13, 30, 60 and slid together within the bottom cap 98, such that when the bottom cap 98 is moved into place at the bottom of the housing 98, the hooked arms 13, 30, 60 are retained securely in place. The hooked arms 13, 30, 60 are also held in place by the floral foam 94. Keyed openings or other such openings can also be similarly employed in other locations on the housing 92.

A temporary decoration kit of the present invention comprises a plurality of modular decorative items and at least one decoration fastener. In one embodiment, the temporary decoration kit includes a plurality of suction cup decoration fasteners 10, a plurality of double-bend decoration fasteners 30, a plurality of triple-bend decoration fasteners 60, one or more multiple decoration fasteners 90, a plurality of modular decorative items, and one or more temporarily attachable messages.

The modular decorative items may comprise floral arrangements, bows, runners, and messages. As used herein, the term "modular" is intended to mean that the decorative items, while being differently configured, are all adapted to be interchangeably received by the various decorative item receivers. Thus, in order to adapt the decorative items to be retained by the decorative item receivers, the decorative items may be formed with a circular or oblong surface such as the depicted stems 46, 86, to be received by the decorative item receivers. Alternatively, the decorative item could be provided with an opening such as the keyed opening 130 of FIG. 7 for connecting to one of the various decorative item receivers of the present invention.

The temporarily attachable messages may be formed as a single, modular unit adapted to be retained by the various decorative item receivers. For instance, the attachable message could comprise a box having the desired message printed thereon and be fitted with openings such as the keyed openings 130 of FIG. 7 as discussed above. Alternatively, the temporarily attachable messages may be independently applicable. One embodiment of a temporarily attachable message (seen at 160 in FIG. 9) comprises a plurality of letters formed of vinyl plastic. Wetting one side of the vinyl letters and placing the vinyl letters on a surface, especially painted metal and glass, causes the vinyl letters to stick to the surface.

Figure 8:
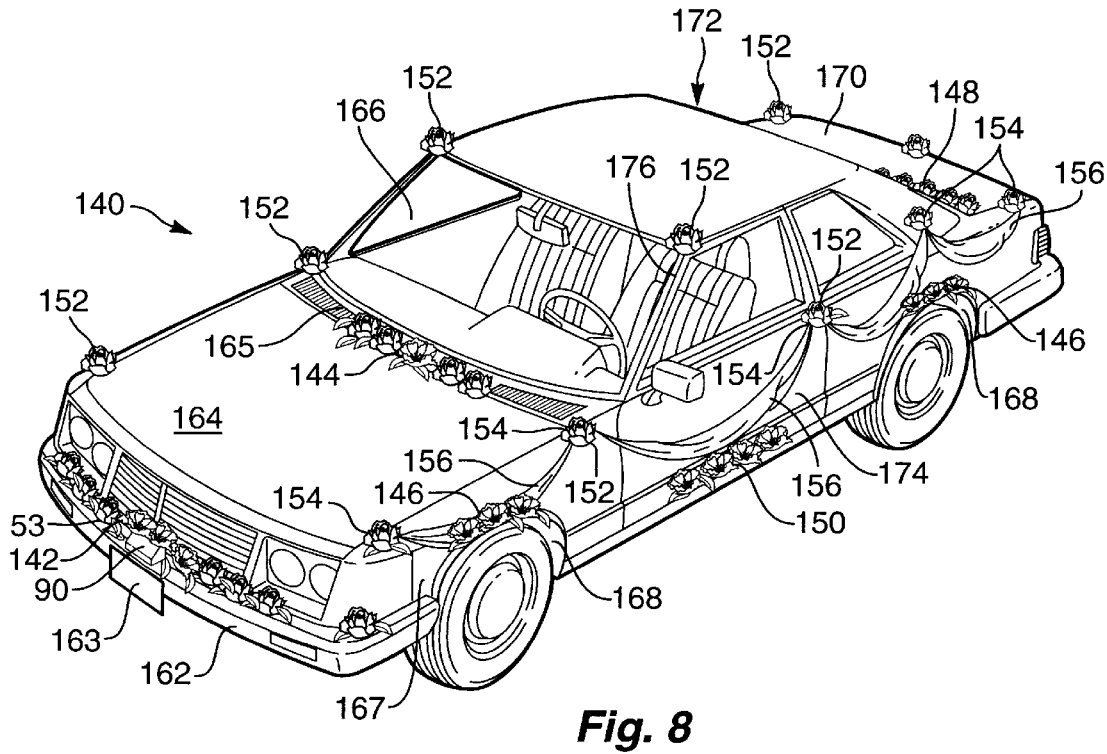
FIG. 8 is a perspective view of an automobile depicting one manner of temporarily decorating a vehicle under the present invention.

FIGS. 8 and 9 show various applications of the temporary decoration kit of the present invention. Different types of modular decorative items are also depicted. FIG. 8 shows several different decorative items temporarily applied to an automobile 140. Shown in FIG. 8 are a front bumper arrangement 142, a deck-lid floral arrangement 144, a wheel well floral arrangement 146, a rear deck arrangement 148, a door arrangement 150, a series of single flowers 152, a series of bows 154, and a runner 156. FIG. 9 shows a truck decorated with decorative items including a bumper arrangement 158, a temporarily attachable message 160, and a plurality of single flowers 152.

The front bumper arrangement 142 of FIG. 8 is attached to a front bumper 162 of the automobile 140. The front bumper arrangement 142 comprises a series of flowers such as the flowers 53 of FIG. 3a, which are connected by a single underlying stem such as the stem 46 of FIG. 3a. The front bumper arrangement 142 may be attached in several different ways. In one embodiment, the front bumper arrangement 142 is merely attached with a series of double-bend decoration fasteners 30 and/or triple bend decoration fasteners 60 which are connected to a thin edge of the front bumper 162. The front bumper arrangement 142 may also be temporarily attached to the front bumper 162 using a multiple decoration fastener 90 of FIG. 7. One manner of so doing is shown below for the rear bumper arrangement 158 of FIG. 9.

The deck-lid arrangement 144 is shown attached to the front deck 165. While the deck-lid arrangement 144 may be attached in either of the above-discussed manners, it is preferred that a plurality of double-bend decoration fasteners 30 be used in the manner discussed above for the floral arrangement 52 of FIG. 3a.

The wheel well arrangement 146 is shown attached to an edge of a fender 167 above a wheel well 168. Preferably, the wheel well arrangement comprises a single underlying stem and is attached to the edge of the fender 167 with a plurality of triple-bend decoration fasteners 60.

The rear-deck arrangement 148 is only partially shown, but attaches in substantially the same manner as the decorative item 52 of FIG. 4, with the exception that it is preferred that the rear deck arrangement 148 comprises a string of flowers 52 with a single underlying stem which is received by a plurality of double-bend decoration fasteners 30 attached to an edge of the trunk lid 54.

The door arrangement 150 is attached to a bottom of a door 174. Any of the above-discussed manners may be employed, but it is preferred that a series of triple-bend decoration fasteners 60 be used and connected to a bottom edge of the door 174.

The single flowers 152 may be organic flowers, but it is preferred that they be fabricated from silk or other light material, as with the flowers 53. The bows 154 may be any suitable bows, and preferably have a central strand at the rear thereof for being received by the decorative item receivers of the present invention. The single flowers 152 and bows 154 are attached at various locations on the automobile 140, such as on window posts 176. The single flowers 152 and bows 154 may be attached with any of the decoration fasteners discussed herein, but are shown fastened with the suction cup decoration fastener 10 of FIG. 1.

The runner 156 is preferably formed of floral net material, and is retained within the same decorative item receivers 12, 32, 62 that retain the single flowers 154. Thus, the runner 156 extends between the single flowers 154.

The rear bumper arrangement 158 of FIG. 9 is shown temporarily attached to a rear bumper 184 and license plate holder 186 of the truck 180. The bumper arrangement 158 may be attached in one of the manners described above using the decoration fasteners 10, 30, 60 or may be temporarily attached using a multiple decoration fastener 90 of FIG. 7.

When using the multiple decoration fastener 90, the suction cup decoration fasteners 10 are secured to the multiple decoration fastener 90 within the keyed openings 130 in the manner discussed above and are then suctionally applied to the top of the bumper 162, 184. Elastic bands 91 are passed around a license plate holder 163,186 on the bumper 162, 184 and secured at the ends to the hooks 102. Other elastic bands or string may also be passed around the rear of the bumper 162 and secured to the license plate holder, tailgate, panel edge, or bumper rim 163 with the ends fastened to the top hooks 100.

In fastening the decorative items to the multiple decoration fastener 90, two elongated rows of flowers 53 are connected with a single underlying stem protruding out the side of the row of flowers 53. The protruding stems are each inserted into one of the lateral stem openings 118 of the multiple decoration fastener 90. The rows of flowers 53 thus extend from about the center of the bumper 162, 186 to the edges of the bumper 162, 186. Other single flowers or other decorative items are then arranged with their stems protruding outward from the openings 120 in the angled top portion 114 and the flat top portion 114.

The temporarily attachable message 160 is shown attached to a tail gate 178 of the truck 180 of FIG. 9. In the depicted embodiment, temporarily attachable message 160 comprises a series of individual characters forming the words "just married." The characters 161 are formed of vinyl plastic and are applied in the manner described above.

The temporary decorations of FIGS. 8 and 9 are only representative examples of the many different ways to temporarily decorate objects of the present invention. It is also contemplated that the temporary decoration kit of the present invention be provided with instructions showing different ways of employing the various components of the kit to decorate vehicles and other objects. It is also contemplated that the kit come in a single package such as a corrugated card board box with slots for individual components. The packaging is preferably heavy duty for repeated use.

Accordingly, in one manner of use of the temporary decoration kit of the present invention, the kit is rented by businesses such as flower shops and bridal boutiques, party stores, and reception centers for a selected period of time.

The present invention provides unique advantages formerly unattainable. With the temporary decoration kit of the present invention, temporary decoration of vehicles, boats, yards, buildings and other locations is easier, more organized, and relatively inexpensive. Creativity is enhanced, providing the decorators with more tools to choose from. Additionally, the temporary decoration kit and various modular decorative items and decoration fasteners can be easily, securely, and safely applied.

With the use of the present invention, the surfaces being decorated are not damaged, and the decorations are securely applied, making it safe to operate vehicles that have been temporarily decorated. The kit also provides a unique method of doing business in which the decorative items can be included with instructions and examples of use, packaged in a convenient box and either sold outright or rented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A kit for temporarily decorating the exterior surfaces of a vehicle without damaging the exterior surfaces, the kit comprising:

a plurality of modular decorative items for decorating the exterior surfaces;

a decoration fastener adherable to one or more of the exterior surfaces for removably and interchangeably attaching the decorative items to the exterior surfaces without damaging the exterior surfaces, the decoration fastener having a contact area of a pliable material adapted to contact the exterior surfaces and a decorative item receiver comprising an opening therein adapted to detachably retain one or more of the decorative items; and a multiple decoration fastener comprising
a hardened housing encasing a block of floral foam;
a plurality of hooks for use in attaching the fastener to a license plate holder of the vehicle;
two lateral sides in the housing, each lateral side having one of the openings therein for insertion of decorative items therein;
a top side in the housing having one or more of the openings therein for insertion of the decorative items therein; and
a suction cup on one side of the housing for suctionally attaching to a smooth surface of the vehicle.

2. The kit of claim 1, wherein the decoration fastener further comprises a suction cup connected with the decorative item receiver for suctionally attaching to the selected surface.

3. The kit of claim 1, wherein the adherable decoration fastener further comprises a clip connected with the decorative item receiver for detachably attaching to the selected surface without causing damage thereto, the clip having a deflectable lip and an exterior comprising a substantially pliable material.

4. The kit of claim 1, wherein the decorative items comprise floral arrangements.

5. The kit of claim 1, further comprising a customizable message removably adherable to the object.

6. The kit of claim 5, wherein the customizable message comprises letters formed substantially of vinyl plastic.

7. The kit of claim 2, further comprising a plurality of decoration fasteners and wherein the decorative items include a decorative runner retainable by the plurality of decoration fasteners, such that the plurality of decoration fasteners are arrangeable to each retain additional decorative items therein in addition to retaining a portion of the decorative runner to extend the decorative runner between the additional decorative items.

* * * * *